(12) United States Patent
Kikuchi et al.

(10) Patent No.: US 10,502,950 B2
(45) Date of Patent: Dec. 10, 2019

(54) WEARABLE DISPLAY DEVICE AND IMAGE DISPLAY METHOD

(71) Applicants: SONY CORPORATION, Tokyo (JP); SONY INTERACTIVE ENTERTAINMENT INC., Tokyo (JP)

(72) Inventors: Koji Kikuchi, Kanagawa (JP); Takamasa Araki, Tokyo (JP); Masatoshi Nakamura, Tokyo (JP); Shotaro Tada, Tokyo (JP); Rei Miyazaki, Chiba (JP)

(73) Assignees: SONY INTERACTIVE ENTERTAINMENT INC., Tokyo (JP); SONY CORPORATION, Tokyo (JP)

( * ) Notice: Subject to any disclaimer, the term of this patent is extended or adjusted under 35 U.S.C. 154(b) by 139 days.

(21) Appl. No.: 15/542,471

(22) PCT Filed: Jan. 14, 2016

(86) PCT No.: PCT/JP2016/050994
§ 371 (c)(1),
(2) Date: Jul. 10, 2017

(87) PCT Pub. No.: WO2016/117448
PCT Pub. Date: Jul. 28, 2016

(65) Prior Publication Data
US 2018/0275398 A1    Sep. 27, 2018

(30) Foreign Application Priority Data
May 29, 2015    (JP) ................. 2015-109883

(51) Int. Cl.
*G02B 27/00* (2006.01)
*G02B 5/22* (2006.01)
(Continued)

(52) U.S. Cl.
CPC ....... *G02B 27/0025* (2013.01); *G02B 3/0006* (2013.01); *G02B 3/0056* (2013.01);
(Continued)

(58) Field of Classification Search
CPC .. G02B 27/017; G02B 27/01; G02B 27/0101; G02B 27/0172; G02B 2027/011;
(Continued)

(56) References Cited

U.S. PATENT DOCUMENTS 5,751,383 A * 5/1998 Yamanaka ........... G02B 27/026
349/13
5,844,713 A   12/1998 Nanba
(Continued)

FOREIGN PATENT DOCUMENTS

JP    07281123 A    10/1995
JP    08240786 A    9/1996
(Continued)

OTHER PUBLICATIONS

International Search Report for corresponding PCT Application No. PCT/JP2016/050994, 5 pages, dated Mar. 15, 2016.
(Continued)

*Primary Examiner* — Dong Hui Liang
(74) *Attorney, Agent, or Firm* — Matthew B. Dernier, Esq.

(57) ABSTRACT

With an image display apparatus, such as a head-mounted display, the eyes of a user observe an image displayed on a display panel through an eyepiece in an enlarged manner. A microlens array sheet that is one example of an optical element functioning as an optical lowpass filter is inserted in an optical path running from the display panel to the eyepiece.

8 Claims, 16 Drawing Sheets

(51) Int. Cl.
*G02B 3/00* (2006.01)
*G02B 25/00* (2006.01)
*G02B 27/01* (2006.01)
*H04N 5/64* (2006.01)
*G02B 1/11* (2015.01)
*G02B 5/30* (2006.01)

(52) U.S. Cl.
CPC ............... *G02B 5/22* (2013.01); *G02B 25/00* (2013.01); *G02B 27/0172* (2013.01); *G02B 1/11* (2013.01); *G02B 5/3083* (2013.01); *G02B 2027/014* (2013.01); *G02B 2027/0123* (2013.01); *H04N 5/64* (2013.01)

(58) Field of Classification Search
CPC ...... G02B 2027/0118; G02B 2027/013; G02B 2027/0147
See application file for complete search history.

(56) References Cited

U.S. PATENT DOCUMENTS

| | | | |
|---|---|---|---|
| 5,991,087 A | | 11/1999 | Rallison |
| 6,791,566 B1* | | 9/2004 | Kuratomi ............ G02B 6/0043 345/204 |
| 8,408,775 B1* | | 4/2013 | Coleman ................. F21V 7/04 362/602 |
| 2006/0098296 A1* | | 5/2006 | Woodgate .......... G02B 27/2214 359/642 |
| 2006/0139759 A1 | | 6/2006 | Hashimoto |
| 2008/0002391 A1* | | 1/2008 | Lee ..................... G02B 5/0236 362/97.1 |
| 2009/0147022 A1* | | 6/2009 | Okuda ................. G06T 3/4007 345/611 |
| 2009/0231698 A1 | | 9/2009 | Hashimoto |
| 2012/0293700 A1 | | 11/2012 | Drouin |
| 2013/0329299 A1* | | 12/2013 | Kim .................... G02B 3/0043 359/619 |
| 2015/0138487 A1 | | 5/2015 | Hirayama |
| 2016/0070103 A1* | | 3/2016 | Yoon ....................... G02B 3/08 345/633 |
| 2016/0127717 A1* | | 5/2016 | Petrov ..................... G09G 3/36 345/419 |

FOREIGN PATENT DOCUMENTS

| | | |
|---|---|---|
| JP | 10228245 A | 8/1998 |
| JP | 2002221703 A | 8/2002 |
| JP | 2005316270 A | 11/2005 |
| JP | 2011039114 A | 2/2011 |
| JP | 2011221124 A | 11/2011 |
| JP | 2013076881 A | 4/2013 |
| WO | 2007049664 A | 5/2007 |
| WO | 2014010523 A1 | 1/2014 |

OTHER PUBLICATIONS

International Preliminary Report and Written Opinion for corresponding PCT Application No. PCT/JP2016/050994, 16 pages, dated Jul. 25, 2017.
Extended European Search Report for corresponding EP Application No. 16740055.5, 8 pages, dated Aug. 29, 2018.
Notification of Reason(s) for Refusal for corresponding JP Application No. 2015-109883, 5 pages, dated Mar. 19, 2019.
The First Office Action for corresponding CN Application No. 201680011213.1, 21 pages, dated Feb. 22, 2019.
Notification of Reason(s) for Refusal for corresponding JP Application No. 2015-109883, 7 pages, dated Oct. 1, 2019.

* cited by examiner

FIG. 2
(a)
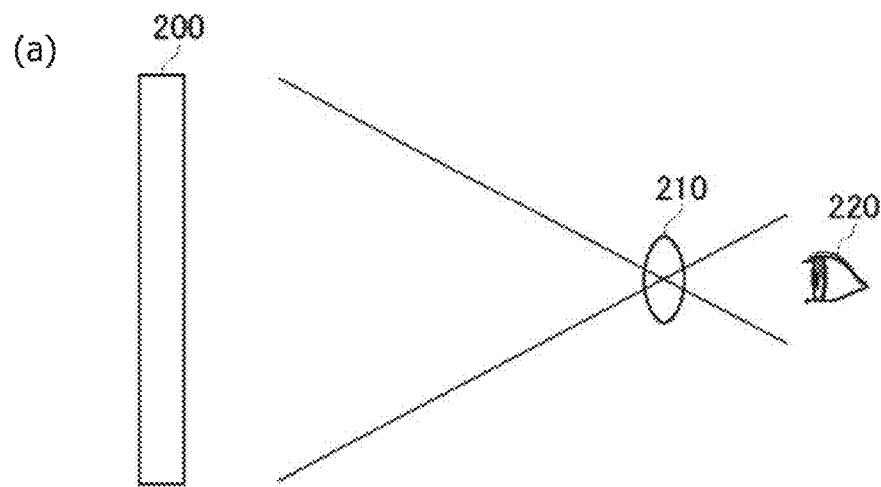
(b)
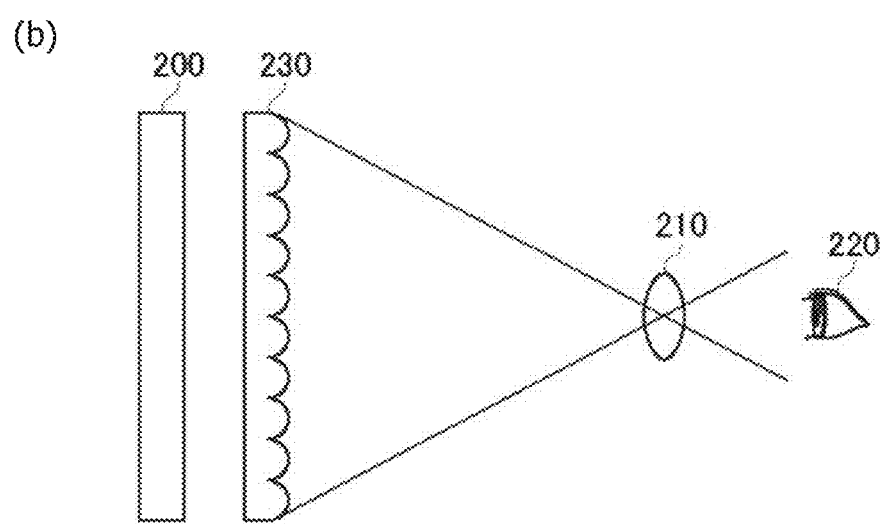

FIG. 3
(a)
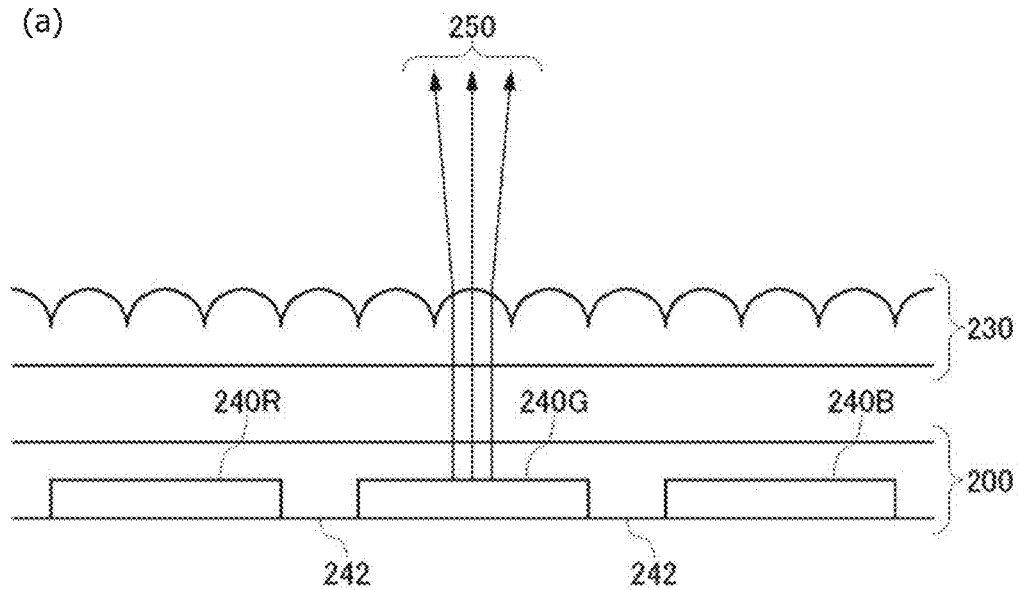
(b)
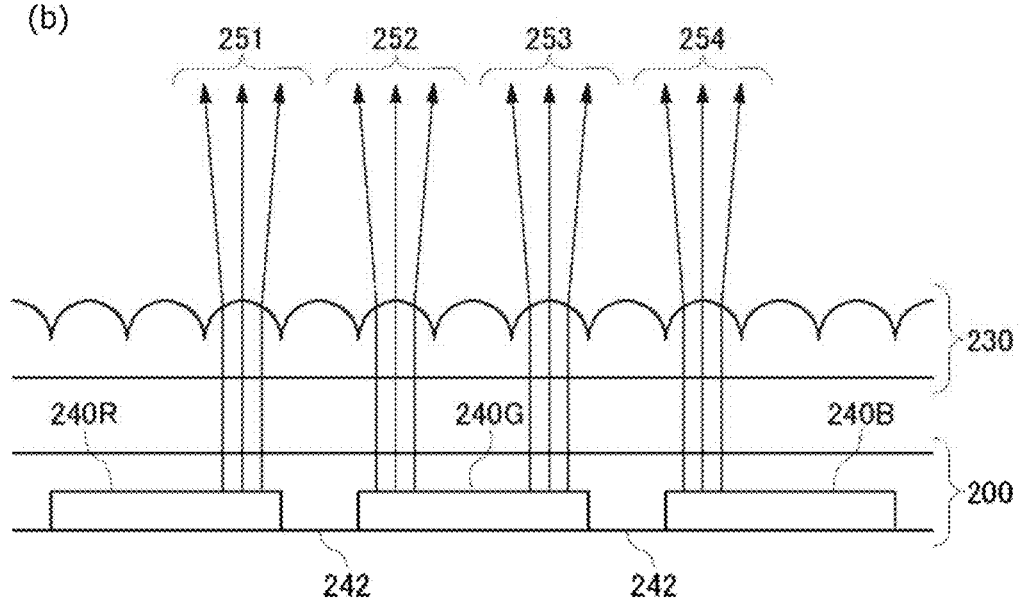

FIG. 4
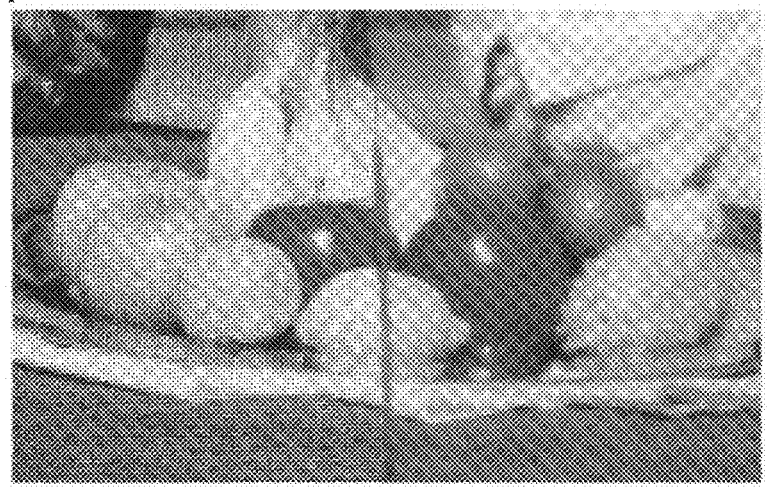
FIG. 5
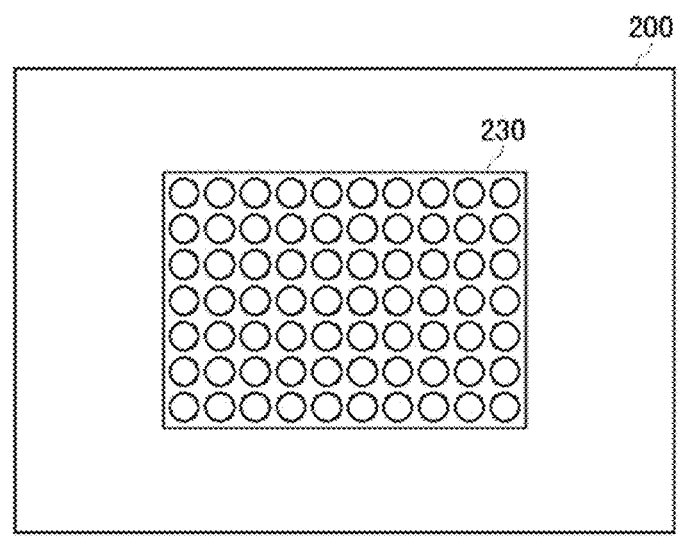
FIG. 6
(a) 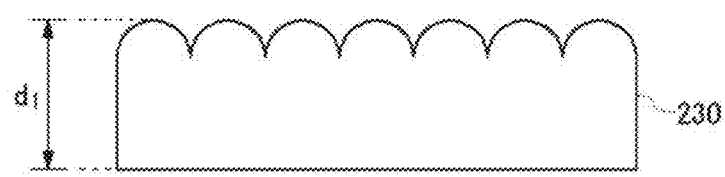
(b) 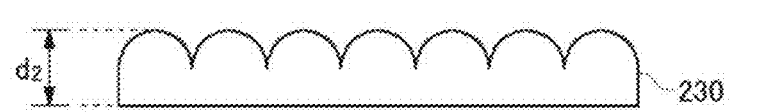

FIG. 7
(a)
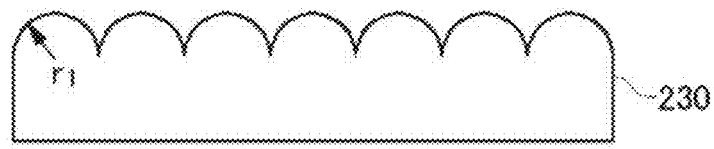
(b)
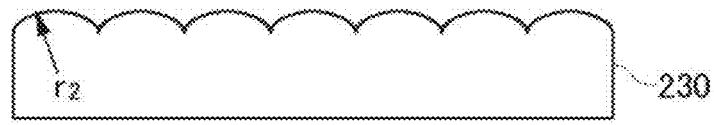

FIG. 12
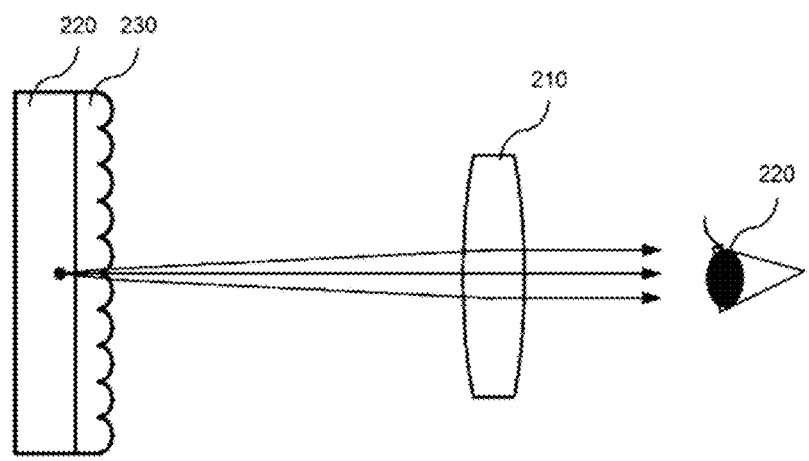
FIG. 13
(a) 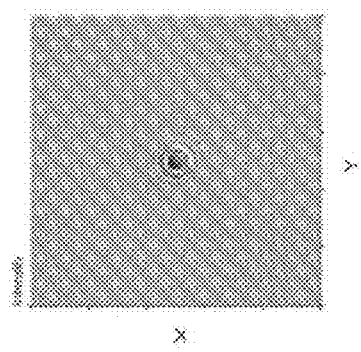   (b) 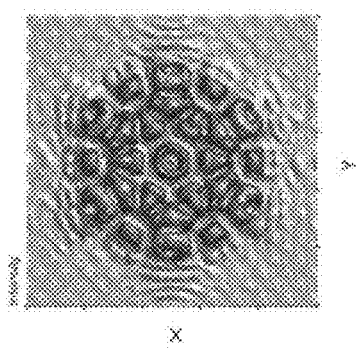

WEARABLE DISPLAY DEVICE AND IMAGE DISPLAY METHOD

TECHNICAL FIELD

The present invention relates to a technology of preventing the visual recognition of a pixel grid of a wearable display.

BACKGROUND ART

A head-mounted display, a head-up display, and a wearable display of glasses type are display apparatuses that, based on an extended optical system applied with a virtual image, display a video image in the very vicinity of the eyeball of a user. Especially, a head-mounted display employs an optical lens high in curvature in order to display a video image having a wide viewing angle in front of the eyes of a user, thereby providing a configuration in which a user looks at a display panel through the lens, while pursuing the reduction in size and weight.

SUMMARY

Technical Problems

With a head-mounted display using a lens high in curvature in order to display a video image having a wide viewing angle in front of the eyes, there occurs a problem that the pixels of the display panel is seen as enlarged, thereby making pixel grids stand out, the pixels being visually recognized as a dot array, resulting in degraded image quality. In addition, since the lens used in a head-mounted display is high in magnification and the minimum diameter of an optical spot is small, there occurs a trend in which a back-focus adjustment sensitivity gets high. As a result, a back-focus adjustment margin at the time of assembling head-mounted displays gets very narrow, thereby reducing the yield in manufacture.

The present invention was done in consideration of the problems described above and an objective thereof is to provide a technology of preventing the visual recognition of pixel grids of a display on a wearable display apparatus with which to observe an image displayed on a display panel through a lens as with a head-mounted display. A further objective is to provide a technology of mitigating the back-focus adjustment sensitivity of an optical system in a wearable display apparatus such as a head-mounted display.

Solution to Problems

In solving the above problems and according to one aspect of the present invention, there is provided a wearable display apparatus having a display panel, an eyepiece, and an optical element that functions as an optical lowpass filter inserted in an optical path running from the above-mentioned display panel to the above-mentioned eyepiece.

According to another aspect of the present invention, there is provided an image display method for displaying, on a wearable display apparatus having a display panel and an eyepiece, an image by inserting an optical element that functions as an optical lowpass filter into an optical path running from the above-mentioned display panel to the above-mentioned eyepiece.

It should be noted that those obtained by converting any combinations of components mentioned above and the expression of the present invention between methods, apparatuses, systems, computer programs, data structures, and recording media are also valid as aspects of the present invention.

Advantageous Effects of Invention

According to the present invention, visual recognition of the pixel grid of a display can be prevented. In addition, the adjustment sensitivity of the back focus of an optical system can be mitigated.

BRIEF DESCRIPTION OF DRAWINGS

FIG. 2(a) is a diagram illustrating an internal configuration of a related-art head-mounted display and FIG. 2(b) is a diagram illustrating an internal configuration of a head-mounted display 100 of the present embodiment.

FIG. 3(a) and FIG. 3(b) are diagrams for describing lowpass filter effects of a microlens array sheet shown in FIG. 2(b).

FIG. 4 is a diagram illustrating an actual example of an image observed by inserting the microlens array sheet into a display panel.

FIG. 5 is a diagram for describing an arrangement position of the microlens array sheet relative to the display panel.

FIG. 6(a) and FIG. 6(b) are diagrams for describing the thicknesses of the microlens array sheet.

FIG. 7(a) and FIG. 7(b) are diagrams for describing the curvatures of the microlenses of the microlens array sheet.

FIG. 12 is a diagram for describing a configuration of an image display apparatus related with an embodiment 1.

FIG. 13(a) is a diagram illustrating a point spread function (PSF) characteristic obtained in an internal configuration of a related-art image display apparatus and FIG. 13(b) is a diagram illustrating a PSF characteristic obtained in the image display apparatus related with the embodiment 1.

DESCRIPTION OF EMBODIMENTS

Figure 1:
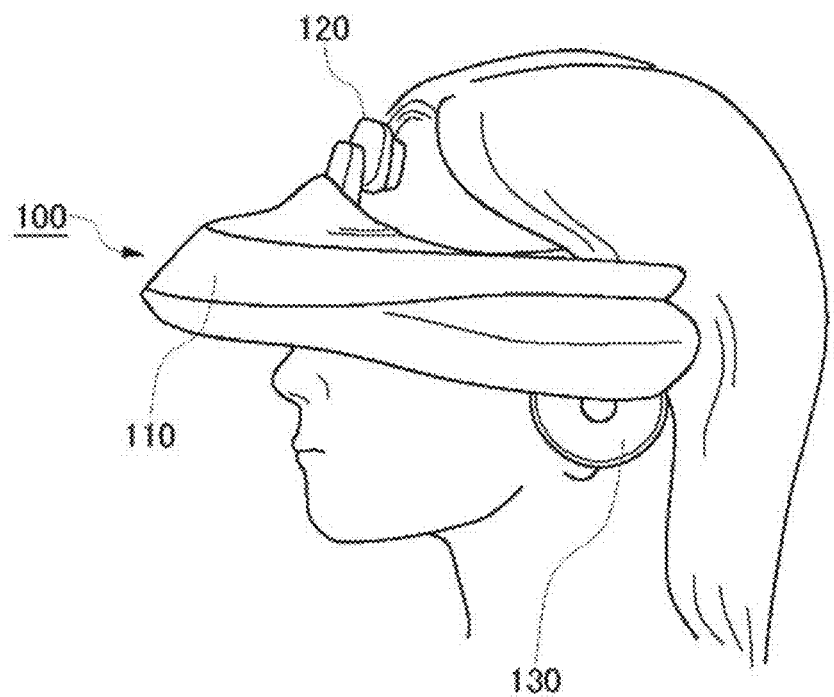
FIG. 1 is an external view of a head-mounted display practiced as one embodiment.

FIG. 1 is an external view of a head-mounted display 100 of the present embodiment. The head-mounted display 100 is one example of a "wearable display apparatus." The head-mounted display 100 includes a body block 110, a front-head-portion contact block 120, and a side-head-portion contact block 130.

The head-mounted display 100 is a display apparatus that is worn on the head of a user so that the user views still images and moving images displayed on a display and hears sound and music outputted from a headphone.

An attitude sensor built in or externally attached to the head-mounted display 100 allows the measurement of attitude information such as the rotational angle and tilt of the head of a user wearing the head-mounted display 100.

Here, the image display apparatus of the present embodiment is described by use of the head-mounted display 100 by way of example; however, the image display apparatus of the present embodiment is applicable to the displaying of images to users wearing not only the head-mounted display 100 in a narrow sense but also glasses, a display of glasses type, a camera of glasses type, a headphone, a headset (a headphone with a microphone), an earphone, an ear ring, an year-hooked camera, a hat, a hat with a camera, a hairband, and the like.

FIG. 2(a) and FIG. 2(b) are diagrams for describing an internal configuration of the head-mounted display 100 of the present embodiment by referring thereto.

FIG. 2(a) shows an internal configuration of a related-art head-mounted display. The head-mounted display is configured to let a user observe, by an eye 220, an image displayed on a display panel 200 through an eyepiece 210. The display panel 200 of the head-mounted display is small in size but, since the display panel 200 is observed as enlarged by the eyepiece 210, the display panel 200 looks, to the user, as if it were a large-size display in front of the eyes of the user. Since each pixel of the display panel 200 is enlarged through the eyepiece 210, a pixel grid becomes conspicuous, resulting in the visual recognition with a dot array highlighted.

FIG. 2(b) shows an internal configuration of the head-mounted display 100 of the present embodiment. In the present embodiment, a microlens array sheet 230 is inserted in the optical path running from the display panel 200 to the eyepiece 210 as one example of an optical element that works as an optical lowpass filter.

As a form in which the microlens array sheet 230 is inserted in the optical path running from the display panel 200 to the eyepiece 210, the microlens array sheet 230 may be attached on the front side of the microlens array sheet 230 after the manufacture of the display panel 200 or arranged in front of the microlens array sheet 230 with a distance. Alternatively, during the manufacture of the display panel 200, the microlens array sheet 230 may be assembled in the display panel 200 for unitization. It should be noted that term "insert" is used herein to denote the inclusion of all these arrangement forms.

When the microlens array sheet 230 is inserted, the display panel 200 is observed as enlarged through the eyepiece 210; however, since an image is blurred by the lowpass filter effect of the microlens array sheet 230, the pixel grid of the display panel 200 is not conspicuous, thereby making no dot array visually recognizable.

FIG. 3(a) and FIG. 3(b) are diagrams for describing the lowpass filter effects of the microlens array sheet 230 shown in FIG. 2(b). As shown in FIG. 3(a), the display panel 200 is arranged with a red pixel 240R, a green pixel 240G, and a blue pixel 240B (generically referred to as "pixel 240") with a black grid section 242 between these pixels 240. In a state where the microlens array sheet 230 is not inserted, observing a line of the pixels 240 by enlarging through the eyepiece 210 makes the black grid section 242 conspicuous, providing the visual recognition of the pixels 240 as a dot array.

However, when the microlens array sheet 230 is inserted, a light from the pixel 240 G passes a microlens of the microlens array sheet 230 to be diffused like a sign 250 as shown in FIG. 3(a), so that the pixel 240G looks blurred. As shown in FIG. 3(b), in a boundary part between the pixels 240, the lights from the adjacent pixels 240 of different colors are diffused like signs 251 through 254 to be mixed due to a microlens diffusion effect, so that the black grid section 242 between the adjacent pixels 240 is blurred, thereby making the pixel grid be not conspicuous. Inserting the microlens array sheet 230 in front of the display panel 200 as described above prevents the visual recognition of the pixel grid of the display panel 200 due to the lowpass filter effect of the microlens array sheet 230.

A microlens array sheet is generally used to collect light to a sensor by arranging it in front of a charge coupled device (CCD) image sensor or the like; here, it should be noted that a microlens array sheet is arranged in front of the display panel 200 to be used for diffusing light from a pixel of the panel.

FIG. 4 is a diagram illustrating an actual example of an image that is observed by inserting the microlens array sheet 230 in the display panel 200. For the sake of comparison, an example in which an image to be displayed on the display panel 200 is observed through the eyepiece 210 with the microlens array sheet 230 inserted only in the right half of the display panel 200, not in the left half, is shown in FIG. 4.

The left half of the image shown in FIG. 4 is an image that is enlarged through the eyepiece 210 with the microlens array sheet 230 not inserted, so that the pixel grid of the display panel 200 is conspicuous, thereby highlighting the dots. The right half of the image shown in FIG. 4 is an image that is enlarged through the eyepiece 210 with the microlens array sheet 230 inserted, so that the pixel grid of the display panel 200 is not conspicuous due to a diffusion effect, resulting in the dots not highlighted.

FIG. 5 is a diagram for describing an arrangement position of the microlens array sheet 230 relative to the display panel 200.

The microlens array sheet 230 may be uniformly arranged so as to cover the entire surface of the display panel 200 or only in the center section of the display panel 200.

The imaging performance of the eyepiece 210 is higher in the center section of the lens than the peripheral section and therefore the peripheral section is not brought into focus, so that an image of the peripheral section of the display panel 200 is blurred as compared with an image in the center section. Hence, it is necessary to make the pixel grid not conspicuous by arranging the microlens array sheet 230 in the center section of the display panel 200; however, in the peripheral section of the display panel 200, the pixel grid is not conspicuous from the beginning without the arrangement of the microlens array sheet 230.

Therefore, given the lens imaging performance as described above, the microlens array sheet 230 can be arranged in the center section of the display panel 200 without arranging the microlens array sheet 230 in the peripheral section of the display panel 200 as shown in FIG. 5. In FIG. 5, the shape of the microlens array sheet 230 is rectangular; however, it is also practicable to make the shape of the microlens array sheet 230 circular in match with the shape of the lens and arrange the circular microlens array sheet 230 in the center section of the display panel 200.

In another method, the curvature, the sheet thickness, or the lens arrangement density of the microlens of the microlens array sheet 230 may be changed so as for the function of the optical lowpass filter of the microlens array sheet 230 to be decreased from the center section to the peripheral section of the microlens array sheet 230. Arranging the resultant microlens array sheet 230 on the display panel 200 allows the reduction of the effect of blurring an image more from the center to periphery of the display panel 200.

It is required to blur an image to an extent in which the pixel grid of the display panel 200 is not conspicuous by the function of the optical lowpass filter of the microlens array sheet 230; however, if this function of the lowpass filter is too strong, the high-frequency component of the image drops, thereby blurring the image itself.

Therefore, it is necessary to do an optimum design of the strength of the optical lowpass filter by adjusting the thickness, the microlens curvature, microlens array pitch of the microlens array sheet 230, and the like in accordance with the pixel size and the red-green-blue (RGB) pixel array pattern of the display panel 200.

FIG. 6(a) and FIG. 6(b) are diagrams for describing the thicknesses of the microlens array sheet 230. As shown in FIG. 6(a) and FIG. 6(b), the optical lowpass filter effect can be adjusted by adjusting the thicknesses d1 and d2 of the microlens array sheet 230. As the thickness of the sheet increases, the optical lowpass filter effect gets higher, thereby blurring the image.

FIG. 7(a) and FIG. 7(b) are diagrams for describing the curvatures of the microlenses of the microlens array sheet 230. Curvature R of the lens is given as the reciprocal number of curvature radius r. As shown in FIG. 7(a) and FIG. 7(b), the optical lowpass filter effect can be adjusted by adjusting curvature radii r1 and r2 of the microlenses of the microlens array sheet 230. As the curvature radius of a lens gets smaller, namely, the curvature gets greater, the optical lowpass filter effect gets greater, thereby blurring the image.

Optimum design is executed by adjusting the strength of the optical lowpass filter effect by adjusting one or both of the thickness of the microlens array sheet 230 and the curvature of the microlens in accordance with the pixel size of the display panel 200. As the pixel of the display panel 200 is greater, the lowpass filter effect is increased so as to blur the image. Further, the array and pitch of the microlens array can be adjusted in match with the pixel array pattern of the display panel 200.

As described above, since the optical characteristics of the microlens array sheet 230 can be adjusted with ease by adjusting the sheet thickness, the microlens curvature, microlens array pitch, and the like, advantages are provided that the optimum design can be made readily in match with the pixel size and pixel array of the display panel 200.

Figure 8:
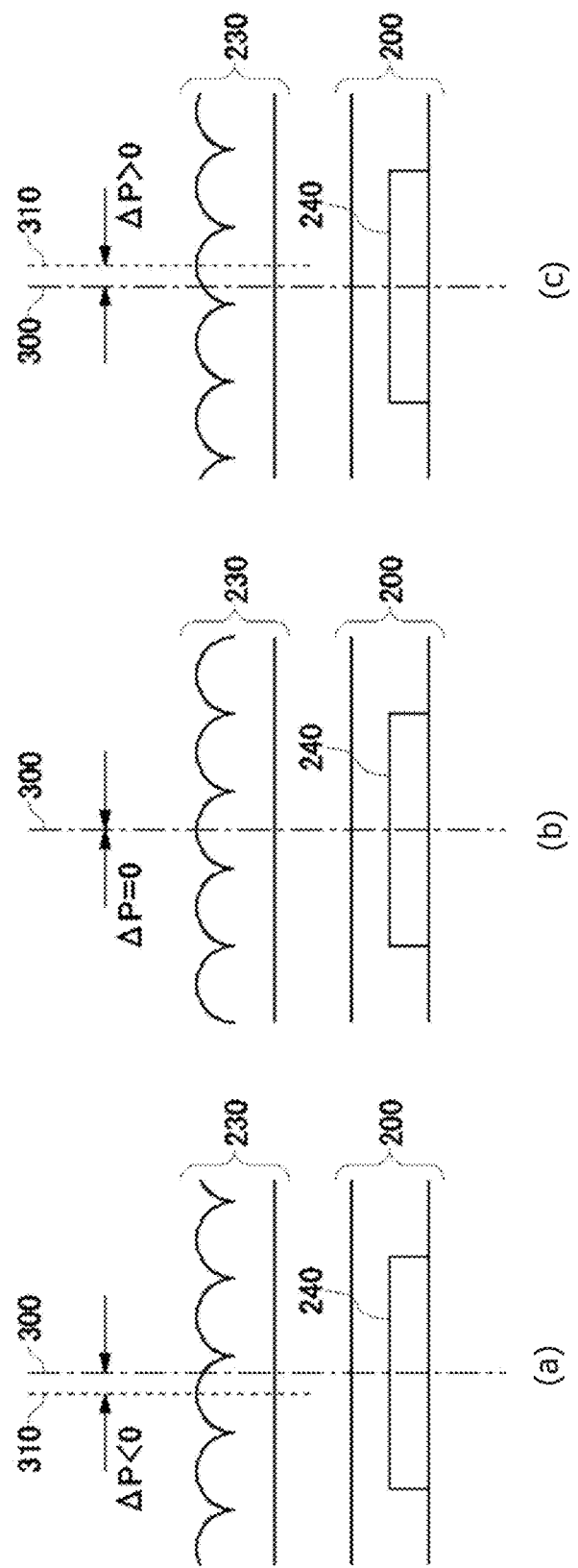
FIG. 8(a) through FIG. 8(c) are diagrams for describing an offset in the alignment between a pixel of the display panel and the microlens of the microlens array sheet.

FIG. 8(a) through FIG. 8(c) are diagrams for describing an offset in the alignment between the pixel 240 of the display panel 200 and the microlens of the microlens array sheet 230.

In FIG. 8(b), the center position of the microlens of the microlens array sheet 230 is in alignment with a center position 300 of the pixel 240 arranged on the display panel 200, an offset ΔP between the pixel center and the lens center being 0.

By contrast, in FIG. 8(c), a center position 310 of the microlens of the microlens array sheet 230 is offset to the right from the center position 300 of the pixel 240 arranged on the display panel 200, the offset ΔP between the pixel center and the lens center being positive.

In FIG. 8(a), the center position 310 of the microlens of the microlens array sheet 230 is offset to the left from the center position 300 of the pixel 240 arranged on the display panel 200, the offset ΔP between the pixel center and the lens center being negative.

The above-mentioned relative positional relation between the microlens and the pixel determines the intensity of the light that passes through the microlens array sheet 230 to reach the eye 220 of a user via the eyepiece 210, of the signal lights emitted from a certain point of the display panel 200. When this light intensity is integrated over the light-emitting pixel area on the display panel 200, an interference between a two-dimensional spatial frequency $G_{PX}(fx, fy)$ of the panel pixel and a two-dimensional spatial frequency $G_{MLA}(fx, fy)$ of the array pattern of the microlens causes a periodic beat in the distribution of the light intensity. This beat in the light intensity distribution causes a moiré in an image that is observed through the microlens array sheet 230.

Figure 9:
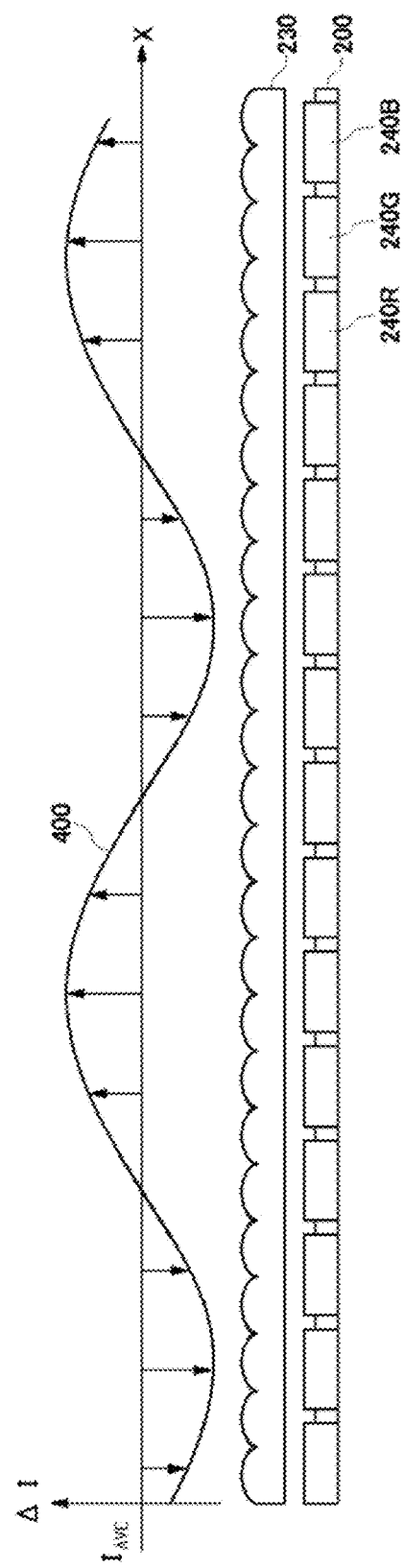
FIG. 9 is a diagram for describing a beat of the relative position between a microlens array and a panel pixel.

FIG. 9 is a diagram for describing the beat in the light intensity distribution caused by the relative positional relation between the microlens array and the panel pixels. An interference between a two dimensional spatial frequency $G_{PX}(fx, fy)$ of the red pixel 240R, the green pixel 240G, and the blue pixel 240B arranged on the display panel 200 and a two-dimensional spatial frequency $G_{MLA}(fx, fy)$ of the array pattern of the microlens of the microlens array sheet 230 causes light intensity change ΔI in light intensity relative to average light intensity $I_{AVE}$, thereby making the light intensity change ΔI periodically change with a specific spatial frequency $G_{MOIRE}$(fx, fy) as shown by a sign 400. A moiré is generated by this beat of the light intensity distribution. The following describes some methods of avoiding such a moiré phenomenon.

Figure 10:
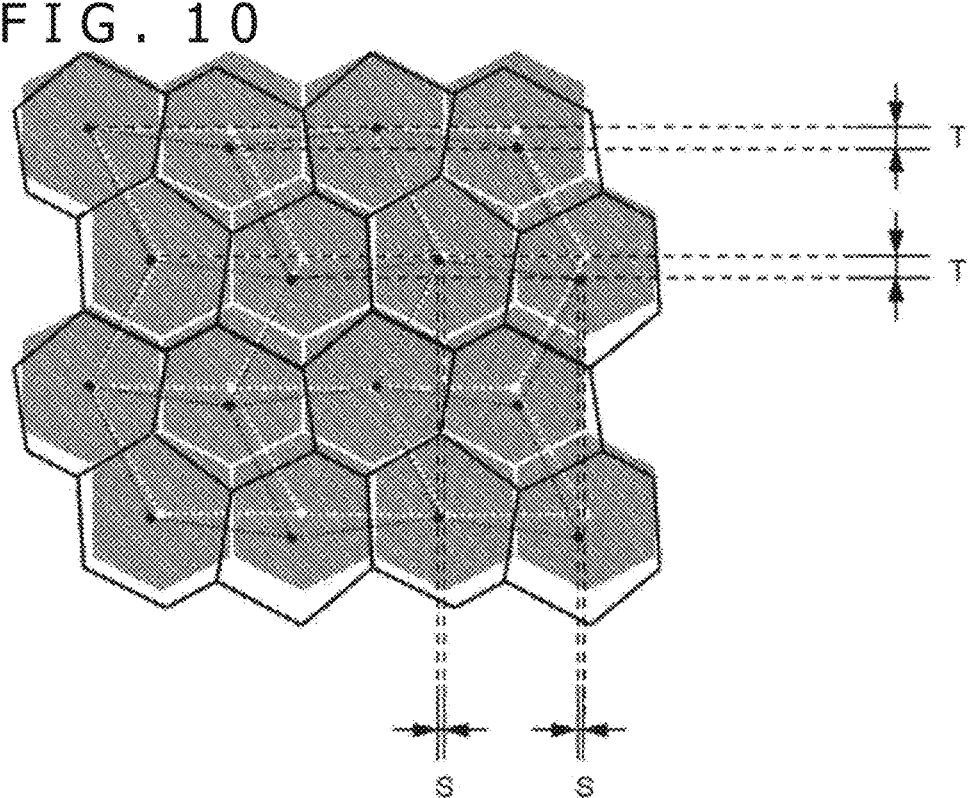
FIG. 10 is a diagram for describing a two-dimensional array pattern of the microlenses of the microlens array sheet.

FIG. 10 is a diagram for describing an array pattern of the microlenses adjusted to prevent the occurrence of a moiré in the microlenses array sheet 230. In an array pattern of microlenses, let the basic pitch of the microlens be $P_{MLA}$ and the pixel size of the above-mentioned display panel be $P_{PX}$, then 10 um≤$P_{MLA}$≤$P_{PX}$ may be satisfied and the two dimensional array coordinate (X, Y) of the microlens center in the microlens array sheet may be determined from the following conditional equations by use of an integer pair (I, J):

$$X = P_{MLA} \times I + \frac{1+(-1)^J}{2} \times \frac{P_{MLA}}{2} - \frac{1+(-1)^I}{2} \times S \quad \text{[Math. 1]}$$

$$Y = P_{MLA} \times \frac{\sqrt{3}}{2} \times J - \frac{1+(-1)^I}{2} \times T$$

In the above-mentioned equations, the first term and the second term of the three terms on the right side of the equation indicative of coordinate X and the first term of the two terms on the right side of the equation indicative of coordinate Y express general honeycomb-shaped patterns and the third term including S on the right side of the equation indicative of coordinate X and the second term including T on the right side of the equation indicative of coordinate Y prevent the occurrence of a moiré, so that the terms are adjusted in accordance with the two-dimensional spatial frequency $G_{PX}$(fx, fy) of the panel pixel.

In the microlens array sheet 230, when the microlens center takes the two-dimensional array described above, the array pattern of microlenses includes two or more frequency components to lose periodicity, thereby weakening the interference with the periodicity of the panel pixels. Consequently, the beat of the light intensity distribution described with reference to FIG. 9 can be cancelled, thereby preventing the occurrence of a moiré. Namely, proper selection of S and T values in accordance with the pixel array of the panel is effective for moiré prevention.

Since the two-dimensional array of the microlenses that is determined by the conditional equations described above is not a complete random array, a uniform optical lowpass filter effect can be obtained without involving the optical nonuniformity inside the plane of the microlens array sheet 230.

In addition, with respect to manufacturing, the two-dimensional array of microlenses that is determined by the conditional equations described can be formulated, so that, in machining a mold for use in forming microlens array sheets, creation of an operation program is not complicated as compared with random arrays, thereby providing advantages without lowering the machining efficiency.

In the description made above, in order to prevent the occurrence of a moiré, an array pattern of microlenses as shown in FIG. 10, namely, an array pattern with 2×2 pieces being the minimum unit of repetition in each directions of (X, Y) is used by way of example; however, array patterns are not limited to this pattern. Here, if the minimum unit of repetition is expressed as N×M pieces, a greater integer pair (N, M) may be taken within a range of not hindering the machining in destroying the periodicity of the array pattern of microlenses.

Figure 11:
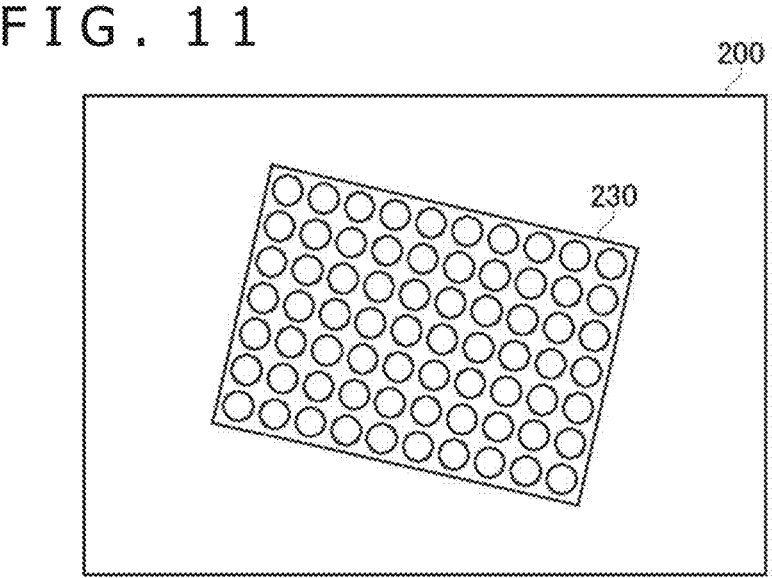
FIG. 11 is a diagram for describing the microlens array sheet arranged on the display panel such that a predetermined angle is provided between a line of pixels and a line of microlenses.

Further, FIG. 11 is a diagram for describing the microlens array sheet 230 arranged on the display panel 200 such that there is given a predetermined angle between the line of pixels and the line of microlenses, as another moiré prevention method. If the microlens array sheet 230 is rotated to be arranged on the display panel 200, the beat of the light intensity distribution described with reference to FIG. 9 is cancelled and an angle at which moiré cancellation takes place is found. Arranging the microlens array sheet 230 on the microlens array sheet 230 at this angle can prevent a moiré from occurring. At this moment, it is preferable for the line of microlenses to take the two-dimensional array described with reference to FIG. 10 and the combined use of these methods can obtain a higher moiré prevention effect.

Still further, the curvature or the apex height of the microlens on the microlens array sheet 230 may be made randomly different for design as still another moiré prevention method. The random curvature and apex height allow the lowering of the beat of the light intensity distribution described with reference to FIG. 9, thereby preventing moiré occurrence. At this moment, it is desirable for the line of microlenses to take the two-dimensional array described with reference to FIG. 10 and the combined use of these methods can obtain a higher moiré prevention effect.

In yet another moiré prevention method, the occurrence of moiré can be prevented by applying the image correction processing of a moiré removal to the image data to be displayed on the display panel mentioned before. For the above-mentioned image correction processing, the beat of the light intensity distribution described with reference to FIG. 9 may be identified in advance so as to execute the processing of synthesizing brightness correction data for cancelling this light intensity distribution with the image data to be displayed on the display panel mentioned before. At this moment, it is desirable for the line of microlenses to take the two-dimensional array described with reference to FIG. 10 and the combined use of these methods can obtain a higher moiré prevention effect.

In the above description, the microlens array sheet 230 is taken as an optical element that functions as an optical lowpass filter by way of example; however, it is also practicable to use any other optical elements that function as an optical lowpass filter. For example, an optical element that functions as an optical lowpass filter may be antiglare sheet or a birefringence element. An antiglare sheet and a birefringence element can make the pixel grid of the display panel 200 not conspicuous when enlarged through the eyepiece 210 by the diffusion of light like the microlens array sheet 230.

An antiglare sheet lowers the reflection of a display surface by being attached on the surface of a display panel and provides merits of low cost and light weight but with the demerits of difficult optical characteristics adjustment, excessive blur, and color unevenness.

For a birefringence element, a birefringence plate such as crystal is available. With a birefringence element, the angle of refraction depends on polarization components, so that a beam is separated into two. Use of this allows the diffusion of light but with demerits of high cost and heavy weight.

According to the present embodiment, inserting a microlens array sheet, an antiglare sheet, or a birefringence element, for example, into an optical path running from the display panel 200 to the eyepiece 210 as an optical element that functions as an optical lowpass filter makes inconspicuous the pixel grid of the display panel 200 as enlarged through the eyepiece 210, thereby preventing the visual recognition of the dot arrays of pixels. This setup allows the maintenance of image quality also when a video image having a wide viewing angle is displayed in front of the eyes by use of an optical lens in the head-mounted display 100.

So far, the present invention has been described on the basis of an embodiment. The embodiment is illustrative only and it is to be understood by those skilled in the art that changes and variations on each of configurational elements and each of processing processes may be made without departing from the spirit or scope of the following claims.

The following describes examples of the above-mentioned variations. In the embodiment mentioned above, the pixel grid of the display panel 200 is made inconspicuous by blurring an image by inserting an optical element that functions as an optical lowpass filter such as a microlens array sheet, an antiglare sheet, or a birefringence element; however, this deteriorates the edge component of the image, thereby presenting such a byproduct as blurring the entire image. Therefore, a high-frequency component may be highlighted in advance in displaying an image on the display panel 200 so as to prevent the deterioration of the original edge component of the image even in the case of inserting an optical element that functions as an optical lowpass filter. This setup can make inconspicuous the pixel grid of a display and, at the same time, prevent the loss of the original edge component of the image.

In the embodiment mentioned above, the head-mounted display 100 is described as one example of a wearable display apparatus; however, it is also practicable to apply the same technology to any other wearable displays such as a wearable display of glasses type. In addition, it should be noted that "wearable display apparatus" as referred to the present specification includes not only a wearable display in the narrow sense that is worn on the body of a user but also a display in a wide sense that displays a video image having a wide viewing angle in front of the eyes of a user although not worn directly on the body of a user like a head-up display for example. This is because the technology described in the present specification is applicable to any displays that have an effect of displaying a video image having a wide viewing angle in front of the eyes of a user regardless of being wearable or not and therefore term "wearable" need not be interpreted literally.

The following describes in detail the embodiments of the image display apparatuses related with the embodiment mentioned above with reference to drawings. It should be noted that, in the present specification and drawings, components having substantially the same functional configuration to that previously described are denoted by the same reference numerals and the duplicate description thereof will be skipped.

Embodiment 1

FIG. 12 illustrates an internal configuration of an image display apparatus of an embodiment 1. In the embodiment 1, the microlens array sheet 230 is inserted in an optical path running from the display panel 200 to the eyepiece 210 as one example of an optical element that functions as an optical lowpass filter, this microlens array sheet 230 being configured as tightly attached on the display side of the display panel 200.

FIG. 13(b) illustrates a simulation result of PSF obtained on the retina of the eye 220 of a user in the configuration of FIG. 12, while FIG. 13(a) illustrates a simulation result of the PSF characteristic in a related-art configuration in which the microlens array sheet 230 is not inserted, for the purpose of comparison. The microlens array sheet 230 is formed with microlenses of curvature radius of 30 um arranged in a general honeycomb shape with a basic pitch of 20 um. In the present embodiment, the enlarging of PSF by the insertion of the microlens array sheet 230 can be confirmed, which indicates that the performance as an optical lowpass filter is realized by lowering the spatial frequency response of an image under observation by this optical diffusion effect. This setup can reduce the sampling noise of panel pixels, thereby preventing the pixel grid from getting conspicuous.

Figure 14:
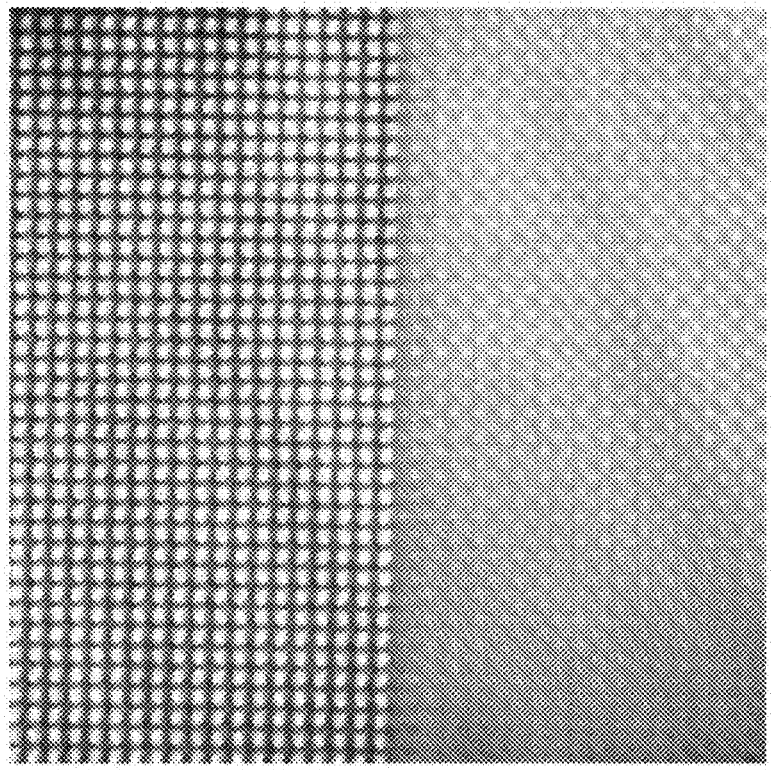
FIG. 14 is a diagram illustrating an image observed on the image display apparatus related with the embodiment 1.

FIG. 14 is a diagram illustrating an actual example of an image that is observed on the image display apparatus of the embodiment 1. For the purpose of comparison, an example in which an image to be displayed on the display panel 200 is observed only through the eyepiece 210 with the microlens array sheet 230 inserted only in the right half of the display panel 200, not in the left half, is shown in FIG. 14.

Since the left half of the image shown in FIG. 14 is an image that is enlarged through the eyepiece 210 with the microlens array sheet 230 not inserted, the pixel grid of the display panel 200 is conspicuous and therefore the dots are highlighted. The right half of the image shown in FIG. 14 is an image enlarged through the eyepiece 210 with the microlens array sheet 230 inserted, so that the pixel grid of the display panel 200 is made inconspicuous by a diffusion effect and therefore the dots are not highlighted, thereby providing a good image quality.

Embodiment 2

The following describes an image display apparatus related with an embodiment 2. It should be noted that the image display apparatus related with the present embodiment is a variation to the image display apparatus related with the embodiment 1 and, unless otherwise explained, similar to the image display apparatus related with the embodiment 1.

In the embodiment 2, an optical lowpass filter effect is adjusted by selecting the thickness of the microlens array sheet 230 as shown in FIG. 6.

Figure 15:
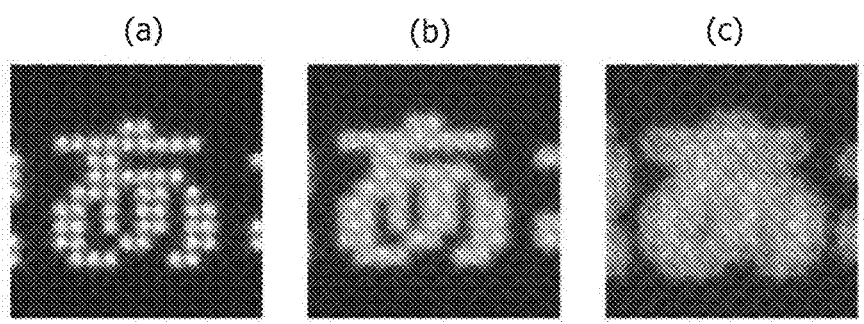
FIG. 15(a) through FIG. 15(c) are diagrams illustrating images observed on an image display apparatus related with an embodiment 2.

FIG. 15 is a diagram illustrating an actual example of an image that is observed on the image display apparatus related with the embodiment 2. The thicknesses of the microlens array sheet 230 are each 100 um in FIG. 15(a), 200 um in FIG. 15(b), and 300 um in FIG. 15(c). The greater the thickness of the sheet, the greater the function of the optical lowpass filter, so that the effect can be confirmed that the image is heavily blurred.

Embodiment 3

The following describes an image display apparatus related with an embodiment 3. It should be noted that the image display apparatus related with the present embodiment is a variation to the image display apparatus related with the embodiment 1 and, unless otherwise explained, similar to the image display apparatus related with the embodiment 1.

In the embodiment 3, an optical lowpass filter effect is adjusted by selecting the curvature radius r of the microlens of the microlens array sheet 230 as shown in FIG. 7.

Figure 16:
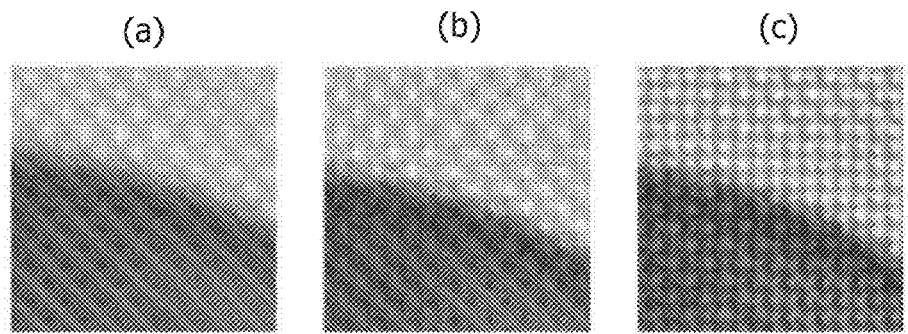
FIG. 16(a) through FIG. 16(c) are diagrams illustrating images observed on an image display apparatus related with an embodiment 3.

FIG. 16 is a diagram illustrating an actual example of an image that is observed on the image display apparatus related with the embodiment 3. The curvature radii r of the microlens are each 30 um in FIG. 16(a), 40 um in FIG. 16(b), and 50 um in FIG. 16(c). The smaller the curvature radius r of a microlens, namely, the greater the curvature R of a lens, the greater the function of the optical lowpass filter, so that the effect can be confirmed that the image is heavily blurred.

Embodiment 4

The following describes an image display apparatus related with an embodiment 4. It should be noted that the image display apparatus related with the present embodiment is a variation to the image display apparatus related with the embodiment 1 and, unless otherwise explained, similar to the image display apparatus related with the embodiment 1.

The embodiment 4 is designed such that the function of the optical lowpass filter of the microlens array sheet 230 is gradually lowered from the center section to the peripheral section of the microlens array sheet 230.

Figure 17:
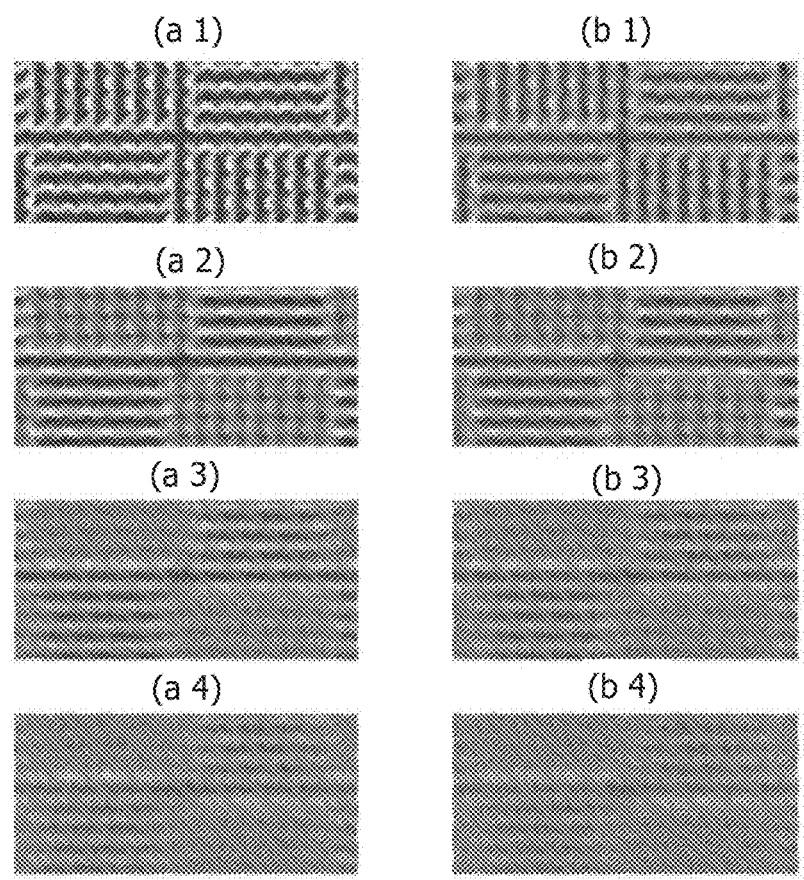
FIG. 17(a1) through FIG. 17(a4) are diagrams illustrating images observed in the internal configuration of a related-art image display apparatus and FIG. 17(b1) through FIG. 17(b4) illustrate images observed on an image display apparatus related with an embodiment 4.

FIG. 17 is a diagram illustrating an actual example of an image that is observed on the image display apparatus related with the embodiment 1. FIG. 17(*b*1) through FIG. 17(*b*4) show the results obtained by image-simulating the resolution feeling that is observed by an image height difference of the display panel 200, an image height being 0% in FIG. 17(*b*1), an image height being 30% in FIG. 17(*b*2), an image height being 50% in FIG. 17(*b*3), and an image height being 70% in FIG. 17(*b*4). In addition, for the purpose of comparison, FIG. 17(*a*1) through FIG. 17(*a*4) show the results obtained by image-simulating the resolution feeling of an image height difference that is observed only through the eyepiece 210 without inserting the microlens array sheet 230 as the internal configuration of a related-art image display apparatus, an image height being 0% in FIG. 17(*a*1), an image height being 30% in FIG. 17(*a*2), an image height being 50% in FIG. 17(*a*3), and an image height being 70% in FIG. 17(*a*4). As seen from these images, the imaging performance of the eyepiece 210 is higher in the center section than the peripheral section of a lens and, since the peripheral section cannot be focused, the peripheral section of the display panel 200 is small in the optical lowpass filter effect provided by the microlens array sheet 230.

Figure 18:
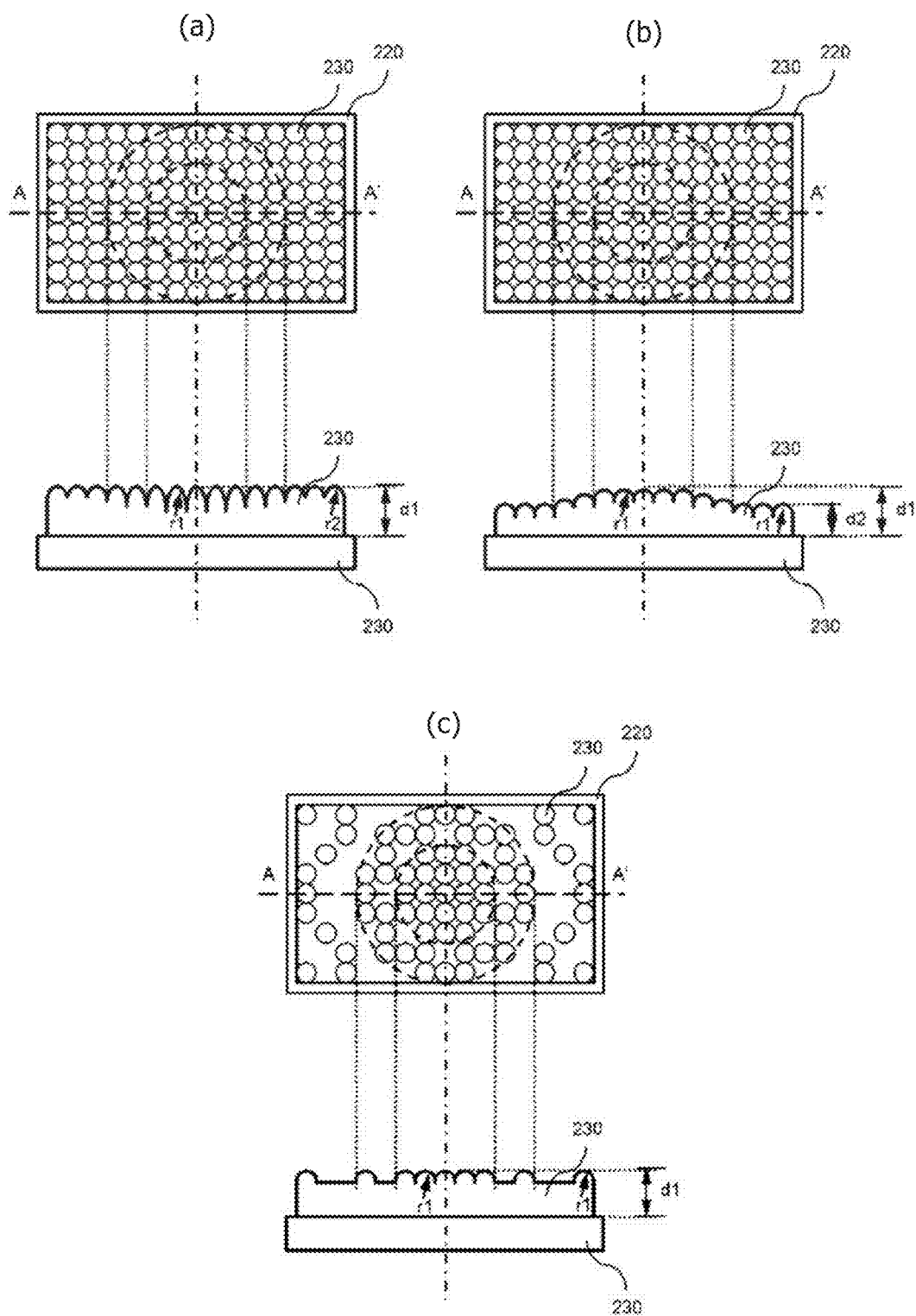
FIG. 18(a) through FIG. 18(c) are diagrams for describing configurations of the image display apparatus related with the embodiment 4.

On the basis of the results mentioned above, the embodiment 4 is designed such that the function of the optical lowpass filter is gradually lowered from the center section to the peripheral section of the microlens array sheet 230 as schematically illustrated in FIG. 18, FIG. 18(*a*) showing the adjusted curvature radius r of each microlens, FIG. 18(*b*) showing the adjusted thickness d of the microlens array sheet, and FIG. 18(*c*) showing the adjusted lens arrangement density.

Embodiment 5

The following describes an image processing apparatus related with an embodiment 5. It should be noted that the image display apparatus related with the present embodiment is a variation to the image display apparatuses related with the embodiments 1 through 4 and, unless otherwise explained, similar to the image display apparatuses related with the embodiments 1 through 4.

In the embodiment 5, the array pattern of the microlenses in the microlens array sheet 230 is adjusted so as to prevent the occurrence of a moiré caused by the beat of the light intensity distribution described with reference to FIG. 9.

In order to avoid the occurrence of a moiré, the embodiment proposes that, let the basic pitch of the microlenses in the microlens array sheet 230 be $P_{MLA}$ and the pixel size of the display panel 200 be $P_{PX}$, then 10 um≤$P_{MLA}$≤$P_{PX}$ may be satisfied and a two-dimensional array coordinate (X, Y) of the microlens center in the microlens array sheet 230 may be determined under the following conditional equations by use of an integer pair (I, J):

$$X = P_{MLA} \times I + \frac{1+(-1)^J}{2} \times \frac{P_{MLA}}{2} - \frac{1+(-1)^I}{2} \times S \quad \text{[Math. 2]}$$

$$Y = P_{MLA} \times \frac{\sqrt{3}}{2} \times J - \frac{1+(-1)^I}{2} \times T$$

Figure 19:
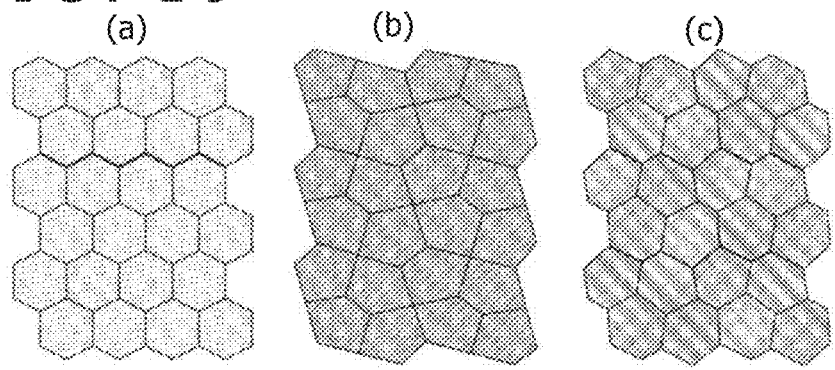
FIG. 19(a) through FIG. 19(c) are diagrams for describing two-dimensional array patterns of microlenses of a microlens array sheet in an embodiment 5.

In the embodiment 5, the moiré suppression effect is adjusted by selecting a pair (S, T) in the conditional equations mentioned above. FIG. 19 illustrates microlens array patterns that are determined when the combination (S, T) is selected, these patterns showing array patterns obtained when FIG. 19(*b*) selects (S, T)=(5.7, 5.0) and FIG. 19(*c*) selects (S, T)=(1.0, 3.0), respectively. It should be noted that, for the purpose of comparison, FIG. 19(*a*) illustrates a general honeycomb-shaped array pattern.

Figure 20:
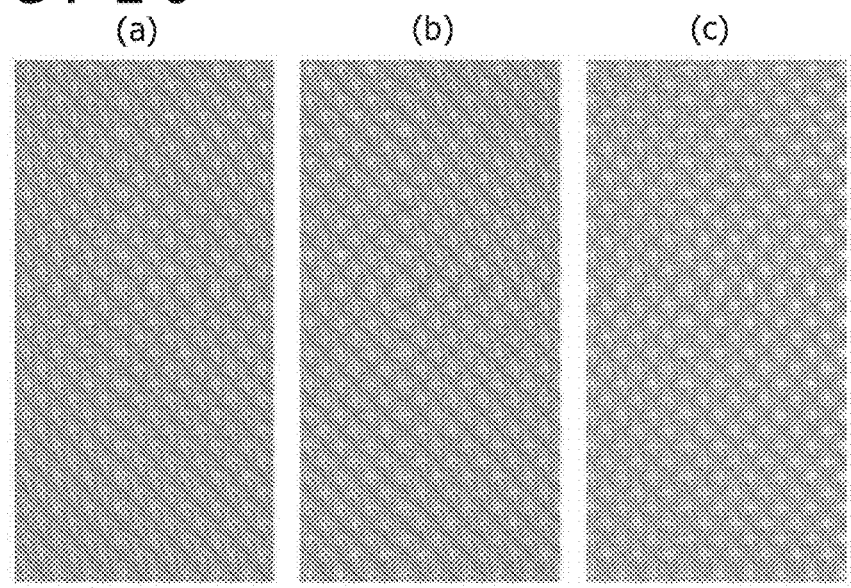
FIG. 20(a) through FIG. 20(c) are diagrams illustrating moiré images observed on an image display apparatus related with the embodiment 5.

FIG. 20 is a diagram illustrating the results obtained by image-simulating a moiré that is observed on the image display apparatus related with the embodiment 5. With pair (S, T) in the conditional equations mentioned above, (S, T)=(5.7, 5.0) in FIG. 20(*b*) and (S, T)=(1.0, 3.0) in FIG. 20(*c*) are provided. It should be noted that, for the purpose of comparison, FIG. 20(*a*) illustrates the results obtained by image-simulating a moiré that is observed when the microlenses are arranged in a general honeycomb shape in the microlens array sheet 230. From these results, it can be confirmed that the intensity of a moiré gets lower from FIG. 20(*a*), FIG. 20(*b*), and FIG. 20(*c*) in this order and properly selecting the combination (S, T) in the conditional equations mentioned above in accordance with the line of panel pixels allows the prevention of the occurrence of a moiré.

Embodiment 6

The following describes an image processing apparatus related with an embodiment 6. It should be noted that the image display apparatus related with the present embodiment is a variation to the image display apparatuses related with the embodiments 1 through 5 and, unless otherwise explained, similar to the image display apparatuses related with the embodiments 1 through 5.

In the embodiment 6, in attaching the microlens array sheet 230 onto the display panel 200, the line of pixels and the line of microlenses are adjusted to form a predetermined angle so as to prevent the occurrence of a moiré that is caused by the beat of the light intensity distribution described with reference to FIG. 9.

Figure 21:
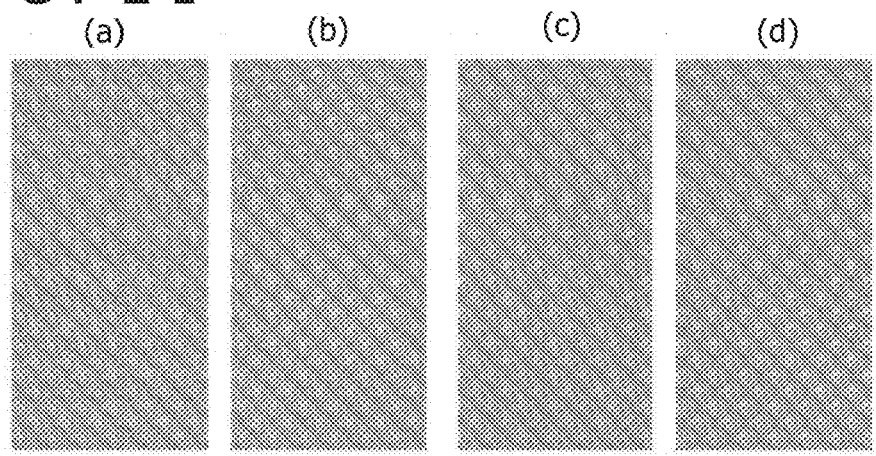
FIG. 21(a) through FIG. 21(c) are diagrams illustrating moiré images observed on an image display apparatus related with an embodiment 6.

FIG. 21 is a diagram illustrating the results obtained by image-simulating a moiré that is observed on the image display apparatus related with the embodiment 6. FIG. 21(*a*) through FIG. 21(*d*) illustrate the results obtained when the microlenses are arranged in a general honeycomb shape in the microlens array sheet 230; the line of pixels in the microlens array sheet 230 and the line of the microlenses in the display panel 200 form angles, 15 degrees (in CW direction) in FIG. 21(*b*), 30 degrees (in CW direction) in FIG. 21(*c*), and 45 degrees (in CW direction) in FIG. 21(*d*), if the state of FIG. 21(*a*) is defined as 0 degrees. From these results, it can be confirmed that moirés are suppressed in FIGS. 21(*b*) and (*c*) and the proper selection of the angle defined between the line of pixels and the line of microlenses allows the prevention of the occurrence of a moiré.

Embodiment 7

The following describes an image processing apparatus related with an embodiment 7. It should be noted that the image display apparatus related with the present embodiment is a variation to the image display apparatuses related with the embodiments 1 through 5 and, unless otherwise explained, similar to the image display apparatuses related with the embodiments 1 through 5.

In the embodiment 7, in order to prevent the occurrence of a moiré that is caused by the beat of the light intensity distribution described with reference to FIG. 9, the two-dimensional array coordinate in the microlens center in the microlens array sheet 230 is determined by selecting the pair (S, T) in the conditional equations described with reference to the embodiment 5 and, in attaching the microlens array sheet 230 onto the display panel 200, the line of pixels and the line of microlenses are adjusted to form a predetermined angle as shown in FIG. 11.

Figure 22:
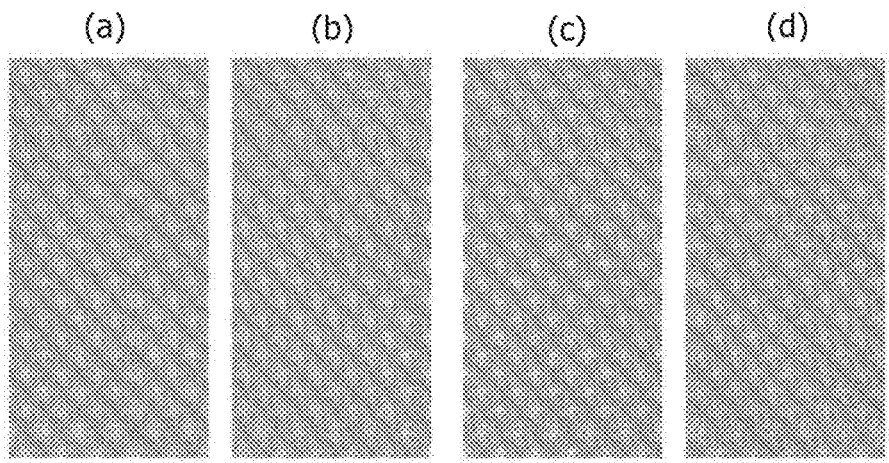
FIG. 22(a) through FIG. 22(c) are diagrams illustrating moiré images observed on an image display apparatus related with an embodiment 7.

FIG. 22 is a diagram illustrating the results obtained by image-simulating a moiré that is observed on an image display apparatus related with the embodiment 7. FIG. 22(a) through FIG. 22(d) illustrate the results obtained when the two-dimensional coordinate in the microlens center in the microlens array sheet 230 is determined such that (S, T)= (1.0, 3.0) is provided in the conditional equations described with reference to the embodiment 5; the line of pixels in the microlens array sheet 230 and the line of the microlenses in the display panel 200 form angles, 15 degrees (in CW direction) in FIG. 22(b), 30 degrees (in CW direction) in FIG. 22(c), and 45 degrees (in CW direction) in FIG. 22(d), if the state of FIG. 22(a) is defined as 0 degrees. From these results, it can be confirmed that moirés are suppressed in FIGS. 22(b) and (c) and the proper selection of the angle defined between the line of pixels and the line of microlenses allows the prevention of the occurrence of a moiré even if the two-dimensional array coordinate in the microlens center is determined by selecting the pair (S, T) in the conditional equations described with reference to the embodiment 5.

The comparison between the results indicated by the embodiment 5 and the embodiment 6 is indicative that, as compared with the images indicated in FIG. 21(a) through FIG. 22(d), the images indicated in FIG. 22(a) through FIG. 22(d) are low in moiré intensity over all even if the angle defined between the line of pixels in the display panel 200 and the line of microlenses in the microlens array sheet 230 changes. These results are indicative that a higher moiré prevention effect can be obtained by simultaneous use of two or more moiré prevention methods proposed by the embodiment.

Embodiment 8

The following describes an image processing apparatus related with an embodiment 8. It should be noted that the image display apparatus related with the present embodiment is a variation to the image display apparatuses related with the embodiments 1 through 5 and, unless otherwise explained, similar to the image display apparatuses related with the embodiments 1 through 5.

In the embodiment 8, in order to prevent the occurrence of a moiré that is caused by the beat of the light intensity distribution described with reference to FIG. 9, image correction processing is executed on the image data to be displayed on the display panel 200, thereby providing a moiré prevention effect. After attaching the microlens array sheet 230 onto the display panel 200, the moiré is taken an image of and the brightness distribution of the moiré is identified from the taken image. Then, the brightness correction processing for cancelling that brightness distribution is executed on the image data to be displayed.

Figure 23:
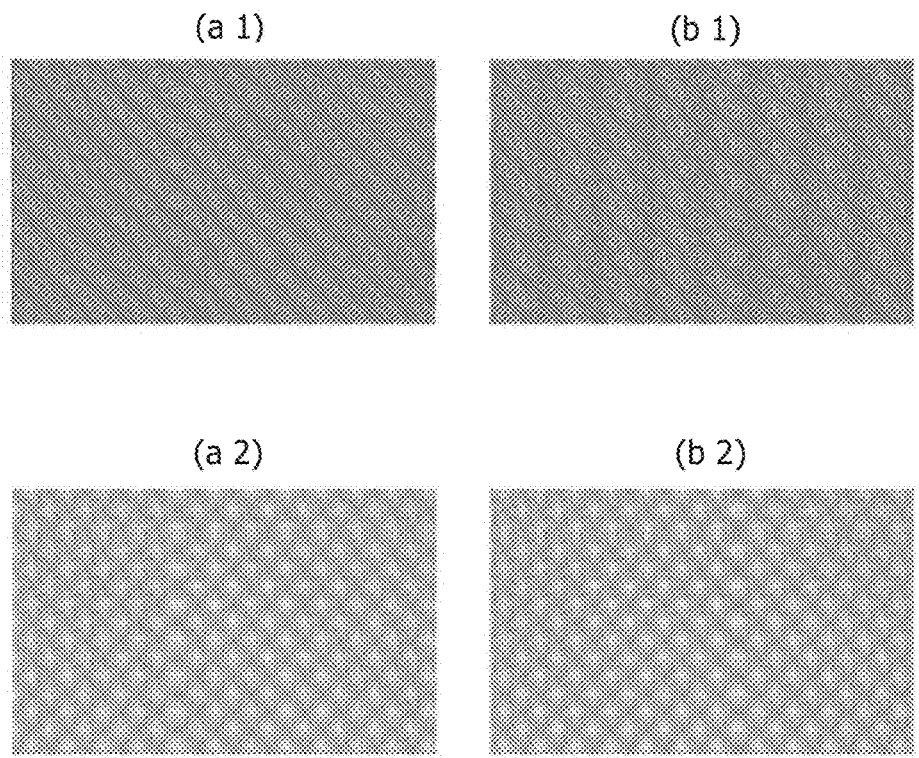
FIG. 23(a1) and FIG. 23(a2) are diagrams illustrating images observed on a related-art image display apparatus and FIG. 23(b1) and FIG. 23(b2) are diagrams illustrating images observed on an image display apparatus related with an embodiment 8.
Figure 24:
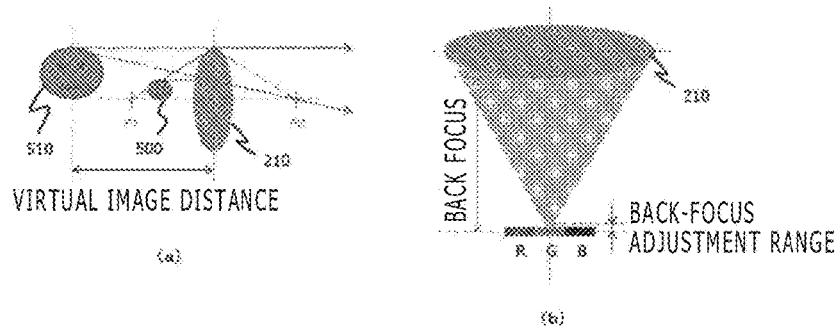
FIG. 24(a) and FIG. 24(b) are diagrams for describing a relation between a virtual image distance and a back focus.
Figure 25:
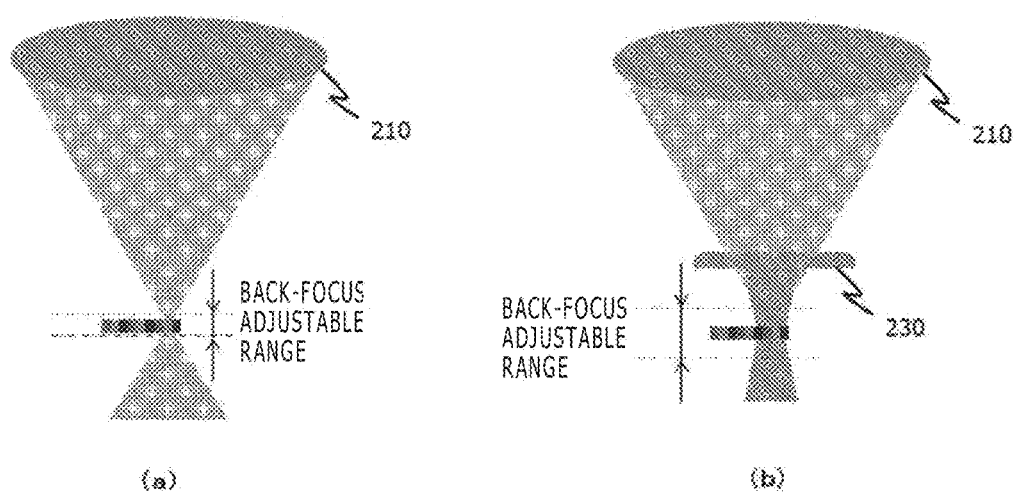
FIG. 25(a) is a diagram illustrating a back-focus adjustable range when no microlens array sheet is used and FIG. 25(b) is a diagram illustrating a back-focus adjustable range when a microlens array sheet 230 is used.

FIG. 23 is a diagram for describing effects of the moiré preventive actions to be executed in the image display apparatus related with the embodiment 8. An image shown in FIG. 23(a1) is an image obtained by observing the display panel 200 without inserting the microlens array sheet 230, an image shown in FIG. 23(a2) is a result observed by inserting the microlens array sheet 230. The results shown in FIG. 23(a1) and FIG. 23(a2) indicate that no moiré prevention method is employed, resulting in the occurrence of a moiré in FIG. 23(a2). From this moiré image, a brightness distribution of the moiré was identified in advance and, at the same time, brightness correction processing was executed on the image data to be displayed on the display panel 200. An image shown in FIG. 23(b1) is a result obtained by observing the display panel 200 on which the image data after correction was displayed without inserting the microlens array sheet 230 and an image shown in FIG. 23(b2) is an image observed by inserting the microlens array sheet 230. From the results described above, it can be confirmed that the moiré is suppressed in FIG. 23(b2) and the occurrence of a moiré can be prevented by executing proper image correction processing on the image data to be displayed on the display panel 200.

The following describes, in more detail, functional effects to be obtained by inserting the microlens array sheet 230 in the image display apparatus of the embodiment with reference to FIG. 24 through FIG. 29.

In the case where, like the head-mounted display 100, an extended optical system based on virtual images is adopted and a lens high in curvature for displaying a video image having a wide viewing angle in front of the eyes is used, a problem is encountered in which a back-focus adjustable range is extremely narrow; however, the back-focus adjustable sensitivity can be mitigated by inserting the microlens array sheet 230 into an optical path so as to enhance the freedom of design. This will be described in detail with reference to FIG. 24 through FIG. 27.

FIG. 24(a) and FIG. 24(b) are diagrams for describing relations between virtual image distance and back focus.

FIG. 24(a) is indicative of positional relations between the eyepiece 210, an object 500, and a virtual image 510. F1 is indicative of a front focus and F2 is indicative of a rear focus in which the virtual image 510 is seen through the eyepiece 210 in the head-mounted display 100. With the optical system of the head-mounted display 100, it is required to manage the virtual image distance at a certain distance by reason of health such as eyestrain mitigation and the convenience of content vergence angle setting. If the virtual image distance is set too near in the head-mounted display 100, eyestrain or dizziness may occur, so that it may be required to set the virtual image distance setting width to 3.0 m or greater and 5.0 m or smaller, for example.

On the other hand, various requirements for designing the head-mounted display 100 compact, widening the viewing angle, and providing higher resolutions, for example, make it a trend that the magnification of the lenses used in the optical system gets higher and the optical spot minimum diameter gets smaller, thereby resulting in a higher back-focus adjustment sensitivity. As a result, as shown in FIG. 24(b), there occurs a problem that the back-focus adjustment margin in product assembly becomes extremely narrow. For example, the back-focus adjustment range becomes as narrow as +/−0.1 mm. Here, "back focus" denotes the distance from the most rear end of a lens to the surface of an object.

FIG. 25(a) is a diagram illustrating a back focus adjustable range obtained when no microlens array sheet is used and FIG. 25(b) is a diagram illustrating a back focus adjustable range obtained when the microlens array sheet 230 is used.

As shown in FIG. 25(a), if the eyepiece 210 high in curvature is used in the head-mounted display 100 and the microlens array sheet 230 is not used, the spot size becomes as small as RGB pixels can be seen and the back-focus adjustable range becomes extremely narrow.

On the other hand, as shown in FIG. 25(b), arranging the microlens array sheet 230 at a proper position on the optical path can prevent the optical spot diameter from converging to a certain level or less, thereby enlarging the spot size and therefore RGB pixels are not seen, resulting in the mitigated back-focus adjustment sensitivity.

Inserting the microlens array sheet 230 as described above can mitigate the back-focus adjustment sensitivity, thereby providing the effects of enhancing the yield in assembly and manufacturing. At the same time, the optical lowpass filter effect of the microlens array sheet 230 provides an effect of properly blurring pixel subpixels, also resulting in the enhancement of image quality.

Figure 26:
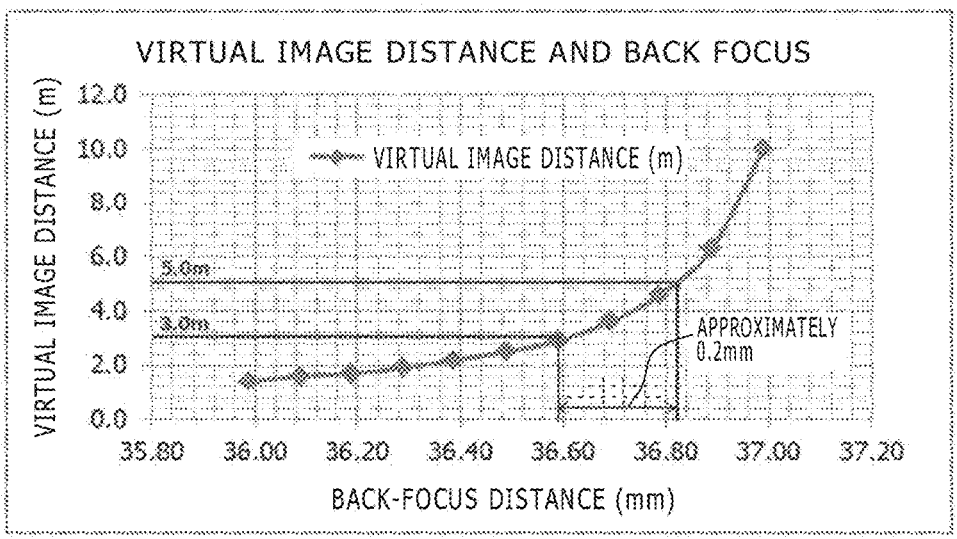
FIG. 26 is a graph illustrating a relation between a virtual image distance and a back-focus distance when no microlens array sheet is used.

FIG. 26 is a graph indicative of a relation between a virtual image distance and a back-focus distance obtained when no microlens array sheet is used. If a virtual image distance setting width is set to 3.0 m or greater and 5.0 m or smaller, then the back-focus adjustment range is +/−0.1 mm. From the graph, it is seen that the greater a virtual image distance, the narrow a back-focus adjustment range.

Figure 27:
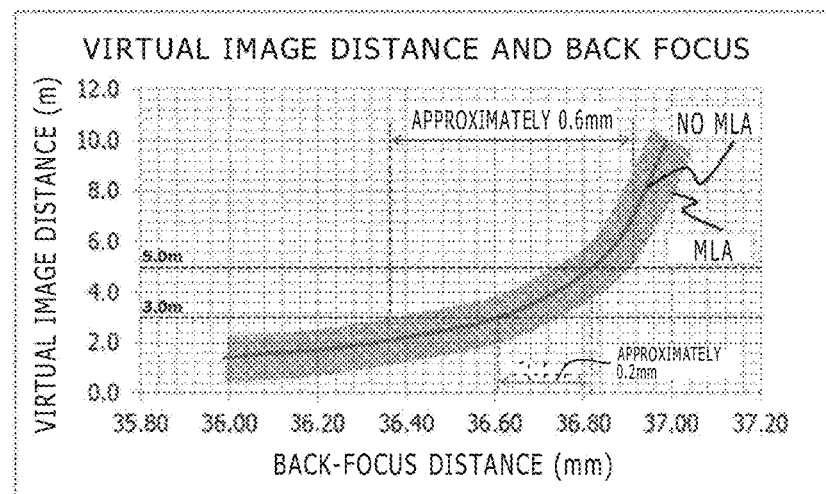
FIG. 27 is a graph conceptually illustrating a relation between a virtual image distance and a back-focus distance when a microlens array sheet is used.

FIG. 27 is a graph conceptually indicative of a relation between a virtual image distance and a back-focus distance obtained when a microlens array sheet is used. Since the use of a microlens array sheet mitigates the back-focus adjustment sensitivity, the graph based on no microlens array sheet shown in FIG. 26 conceptually has a width, so that setting the virtual image distance setting width to 3.0 m or greater and 5.0 m or smaller as mentioned above widens the back-focus adjustment range up to +/−0.3 mm.

Figure 28:
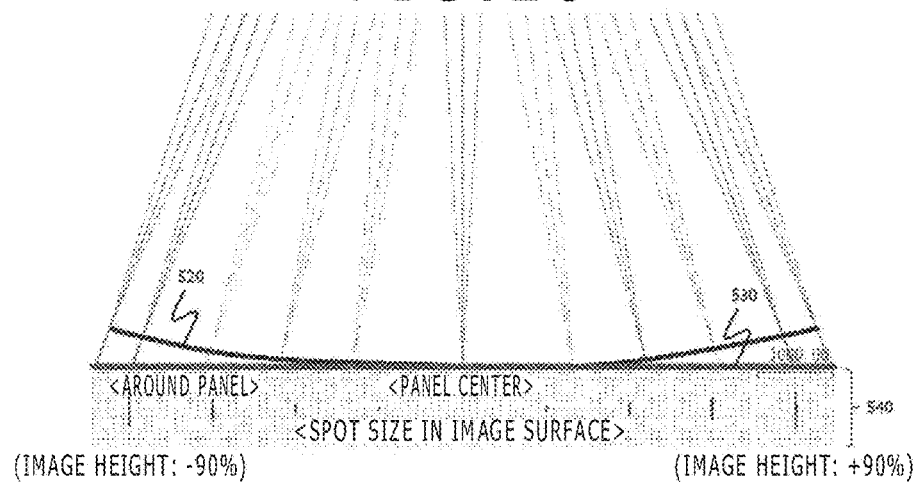
FIG. 28 is a diagram for describing a spot size in an image surface.
Figure 29:
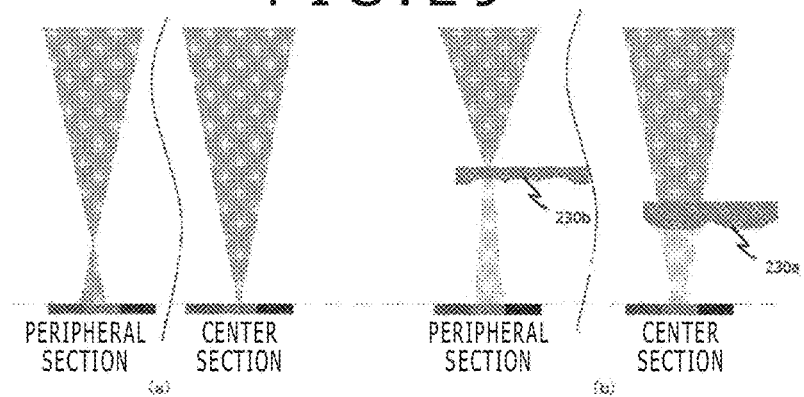
FIG. 29(a) is a diagram illustrating resolutions of a panel center section and a panel peripheral section obtained when no microlens array sheet is used and FIG. 29(b) is a diagram illustrating resolutions of the panel center section and the panel peripheral section obtained when a microlens array sheet is used.

The following describes functional effects obtained by making different optical lowpass filter effects between the center section and the peripheral section of the microlens array sheet 230 with reference to FIG. 28 and FIG. 29.

FIG. 28 is a diagram for describing a spot size on an image surface. The best focus point of the eyepiece 210 is a curved surface indicated by a sign 520, while a surface (an image surface) of a display panel of the head-mounted display 100 is flat as indicated by a sign 530. Hence, as compared with the panel center indicated by a sign 540, the spot size in image eye gets larger as it goes to the area around a panel. Thus, with the optical design of the head-mounted display 100 having a wide viewing angle, there is a trend that the resolution is deteriorated in the peripheral section higher in image height.

Therefore, in inserting the microlens array sheet 230, it is considered that, while the pixel grid is kept inconspicuous by the diffusion effect by increasing the optical lowpass filter effect in the center section, the resolution is increased by lowering the optical lowpass filter effect or, conversely, by a condensing effect in the peripheral section.

FIG. 29(a) is a diagram illustrating the resolutions of the panel center section and the panel peripheral section obtained when no microlens array sheet is used and FIG. 29(b) is a diagram illustrating the resolutions of the panel center section and the panel peripheral section obtained when a microlens array sheet is used.

As shown in FIG. 29(a), if no microlens array sheet is used, the panel center section is in focus and therefore the resolution is highest, whereas the panel peripheral section is out of focus, the resolution being lowered.

On the other hand, as shown in FIG. 29(b), if the microlens array sheet 230 is used, the microlens array sheet 230 is configured such that a diffusion effect indicated by a sign 230a is provided in the panel center section and the microlens array sheet 230 is configured such that a condensing effect indicated by a sign 230b is provided in the panel peripheral section. Consequently, in the center section, an effect is provided in which the RGB subpixels are hardly seen by an optical lowpass filter effect, while, conversely, in the peripheral section, an effect is provided for improving the resolution by a condensing effect.

REFERENCE SIGNS LIST

100 . . . Head-mounted display, 110 . . . Body block, 120 . . . Front-head-portion contact block, 130 . . . Side-head-portion contact block, 200 . . . Display panel, 210 . . . Eyepiece, Eye, 230 . . . Microlens array sheet, 240 . . . Pixel

INDUSTRIAL APPLICABILITY

The present invention is applicable to wearable display apparatuses.

The invention claimed is:

1. A wearable display panel comprising:
a display panel;
an eyepiece; and
an optical element that functions as an optical lowpass filter inserted in an optical path running from said display panel to said eyepiece,
wherein the optical element that functions as said optical lowpass filter is configured such that a diffusion effect is provided in a center section of said display panel and such that a condensing effect is provided in a peripheral section of said display panel.

2. The wearable display apparatus according to claim 1, wherein an optical element that functions as said optical lowpass filter is any one of a microlens array sheet, an antiglare sheet, and a birefringence element.

3. The wearable display apparatus according to claim 1, wherein an optical element that functions as said optical lowpass filter is designed in advance such that, as a size of a pixel of said display panel gets larger, an effect as an optical lowpass filter gets greater.

4. The wearable display apparatus according to claim 1, wherein an optical element that functions as said optical lowpass filter is a microlens array sheet, and said microlens array sheet is designed with a thickness of said microlens array sheet or a curvature of a microlens adjusted in accordance with a size of a pixel of said display panel.

5. The wearable display apparatus according to claim 1, wherein an optical element that functions as said optical lowpass filter is a microlens array sheet and designed such that, in order to prevent a moiré from occurring by an interference between a two-dimensional spatial frequency of a pixel array of said display panel and a two-dimensional spatial frequency of an array pattern of microlenses in said microlens array sheet, a two-dimensional spatial frequency of an array pattern of microlenses is adjusted by offsetting a two-dimensional array coordinate of a microlens center in said microlens array sheet from a honeycomb grid.

6. The wearable display apparatus according to claim 1, wherein an optical element that functions as said optical lowpass filter is a microlens array sheet, and in order to prevent a moiré from occurring by an interference between a two-dimensional spatial frequency of a pixel array of said display panel and a two-dimensional spatial frequency of an array pattern of microlenses in a microlens array sheet, a microlens array sheet is arranged such that a line of pixels of said display panel and a line of microlenses in a microlens array sheet form a predetermined angle.

7. The wearable display apparatus according to claim 1, wherein an optical element that functions as said optical lowpass filter is a microlens array sheet, and in order to prevent a moiré from occurring by an interference between a two-dimensional spatial frequency of a pixel array of said display panel and a two-dimensional spatial frequency of an array pattern of microlenses in a microlens array sheet, an image correction processing for cancelling a light intensity distribution of a moiré is added in advance to image data to be displayed on said display panel.

8. An image display method for displaying, on a wearable display apparatus having a display panel and an eyepiece, an image by inserting an optical element that functions as an optical lowpass filter into an optical path running from said display panel to said eyepiece, wherein the optical element that functions as said optical lowpass filter is configured such that a diffusion effect is provided in a center section of said display panel and such that a condensing effect is provided in a peripheral section of said display panel.

\* \* \* \* \*